R. M. BURGESS.
SPRING WHEEL.
APPLICATION FILED OCT. 14, 1911.

1,052,565.

Patented Feb. 11, 1913.

Witnesses
Philip E. Barnes
V. B. Hillyard

Inventor
R. M. Burgess
By Victor J. Evans
Attorney

UNITED STATES PATENT OFFICE.

ROBERT M. BURGESS, OF COLUMBIA, MISSOURI.

SPRING-WHEEL.

1,052,565.  Specification of Letters Patent.  Patented Feb. 11, 1913.

Application filed October 14, 1911. Serial No. 654,685.

*To all whom it may concern:*

Be it known that I, ROBERT M. BURGESS, a citizen of the United States, residing at Columbia, in the county of Boone and State of Missouri, have invented new and useful Improvements in Spring-Wheels, of which the following is a specification.

This invention provides a novel form of wheel in which the hub, spokes and rim have a limited relative play, with the result that the impact on the tire is received in a manner to relieve the shock, to maintain an equilibrium and to decrease the rolling friction of the wheel.

The invention consists of the novel features, details of construction and combination of parts, which hereinafter will be more particularly set forth, illustrated in the accompanying drawing, and pointed out in the appended claim.

Figure 1:
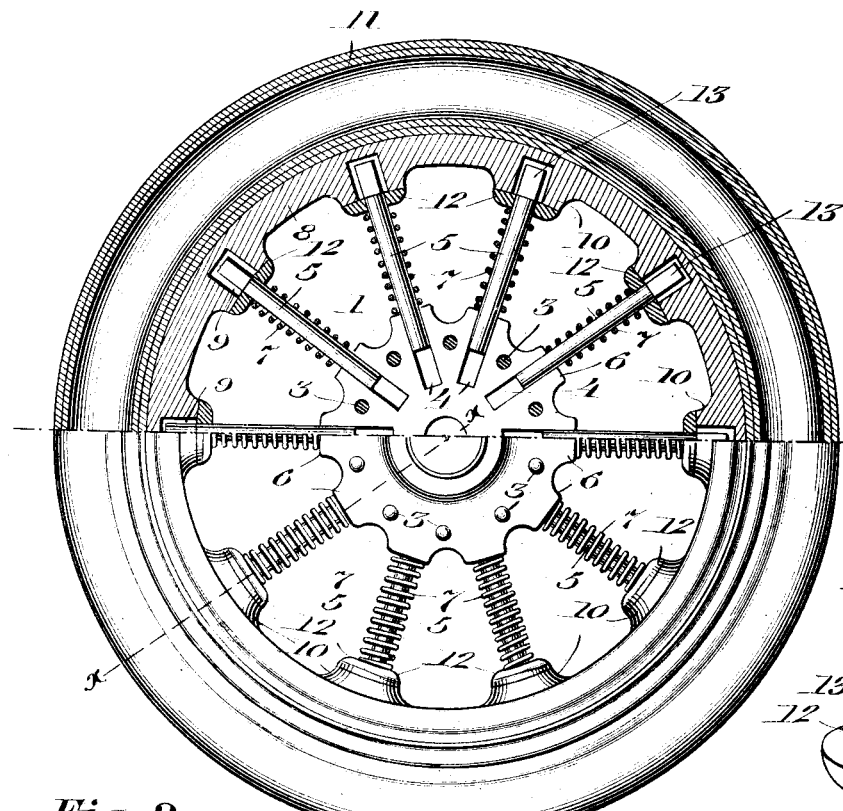
Figure 4:
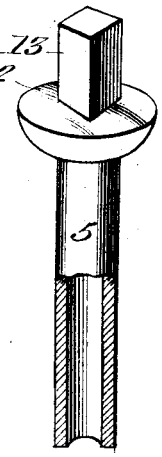
Figure 2:
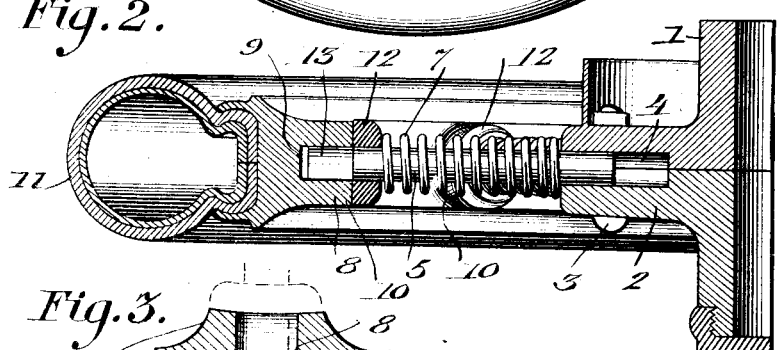
Figure 3:
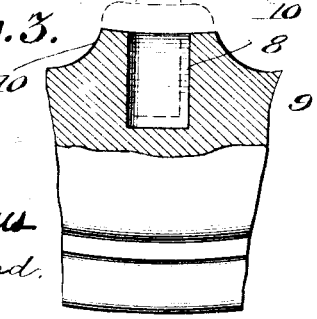

Referring to the drawing, forming a part of the specification, Figure 1 is a side view of a spring wheel embodying the invention having a portion in section. Fig. 2 is a transverse section on the line $x$—$x$ of Fig. 1. Fig. 3 is an enlarged view of a portion of the rim, showing the curved seat for reception of the collar or shoulder provided upon the outer portion of the spoke. Fig. 4 is a detail view of the outer portion of the spoke.

Corresponding and like parts are referred to in the following description, and indicated in all the views of the drawing, by the same reference characters.

The hub of the wheel comprises two parts or sections 1 and 2 which are adapted to be secured by means of bolts or like fastenings 3. Sockets 4 are formed in the outer portion of the hub to receive the inner ends of the spokes 5. The outer portion of the hub has projecting portions 6 in line with the spoke sockets 4. The projecting portions 6 result in the provision of extended spoke sockets and also receive the end thrust of helical springs 7, which are mounted upon the spokes 5.

The rim 8 has spoke sockets 9 corresponding in number and position with the outer ends of the spokes 5. Inner projections 10 are formed upon the inner wall of the rim 8 in line with the spoke sockets 9 and result in the formation of extended spoke sockets. The spoke sockets 9 are elongated circumferentially, thereby admitting of a relative play of the rim in a vertical plane so as to prevent bending of the spokes that may happen to occupy an approximately horizontal position. The rim 8 may be of any construction and usually consists of metal which may be provided with a tire 11 of any variety or make. The inner ends of the projections 10 are curved circumferentially to form seats against which collars or shoulders 12 at the outer ends of the spokes obtain a bearing.

The spokes 5 may be of any construction and usually consist of metal tubing. The inner ends of the spokes fit snugly within the sockets 4 and have a limited radial movement therein. The outer ends of the spokes are made angular, as indicated at 13, to fit within the spoke sockets 9. The spokes at their outer ends fit snugly between the side walls of the sockets 9 but have a limited circumferential movement in the plane of the wheel, thereby preventing bending of the spokes which may happen to occupy a substantially horizontal position. The collars 12 are shrunk upon or otherwise rigidly secured to the outer end portions of the spokes in position to obtain a bearing upon the curved ends of the projections 10. These collars 12 also form stop shoulders to limit the outward movement of the spokes with reference to the rim and also to receive the end thrust of the springs 7.

The springs 7 are expansible and of helical form and are constructed of stout wire having a tension to withstand the strain and load to which the wheel is to be subjected. The springs 7 are slipped upon the spokes and are confined between the collars or stop shoulders 12 and the projections 6 of the hub.

When the wheel is in operation the rim has a relative vertical play which is sustained by means of the springs 7, the spokes having a limited radial movement by the play provided between their inner ends and the spoke sockets 4. The construction is such that any spoke may be easily replaced in the event of damage thereto.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A spring wheel comprising a sectional hub having spoke sockets partly formed in the sections, said hub having projecting portions in line with the spoke sockets, spokes having their inner ends fitted within the sockets of the hub and having a limited radial movement therein, said spokes having their outer ends made angular and provided at the base of the angular portions with stop shoulders, a rim having circumferentially elongated sockets for receiving the angular ends of the spokes, said rim having inner projections in line with the sockets and having the inner ends of the projections circumferentially curved to form seats upon which are fitted the stop shoulders at the outer ends of the spokes, and helical springs of the expansible type mounted upon the spokes and confined between the projections of the hub and stop shoulders near the outer ends of the spokes.

In testimony whereof I affix my signature in presence of two witnesses.

ROBERT M. BURGESS.

Witnesses:
R. WARREN ROBERTS,
HERLEY S. DAILY.